United States Patent [19]

Yokota et al.

[11] Patent Number: 5,847,662
[45] Date of Patent: Dec. 8, 1998

[54] RADIO CARD COMMUNICATION APPARATUS

[75] Inventors: Tsuneshi Yokota, Kawasaki; Tetsuo Saitoh, Yokohama; Seiji Ohura, Kawasaki; Takanobu Ishibashi, Tokyo; Hiroyasu Uchida, Kawasaki, all of Japan

[73] Assignee: Kabushiki Kaisha Toshiba, Kawasaki, Japan

[21] Appl. No.: 579,201

[22] Filed: Dec. 27, 1995

[30] Foreign Application Priority Data

Dec. 27, 1994 [JP] Japan .................................. 6-326346

[51] Int. Cl.⁶ .................................................. H04Q 7/00
[52] U.S. Cl. ................................ 340/825.54; 340/825.34
[58] Field of Search ........................... 340/825, 825.54, 340/825.34, 825.31, 572, 426, 825.69, 825.72; 235/380; 342/44

[56] References Cited

U.S. PATENT DOCUMENTS

| | | | |
|---|---|---|---|
| 4,068,232 | 1/1978 | Meyers | 342/44 |
| 4,546,241 | 10/1985 | Walton | 235/380 |
| 4,691,202 | 9/1987 | Denne et al. | 340/825.54 |
| 4,730,188 | 3/1988 | Milheiser | 340/825 |
| 4,864,292 | 9/1989 | Nieuwkoop | 340/825.31 |
| 5,280,267 | 1/1994 | Reggiani | 340/426 |

FOREIGN PATENT DOCUMENTS 3-296889  12/1991  Japan .

*Primary Examiner*—Edwin C. Holloway, III
*Attorney, Agent, or Firm*—Pillsbury Madison & Sutro LLP

[57] ABSTRACT

A read request signal containing a command, an address, etc. is subjected to two-phase modulation with the first carrier of a first frequency and the resultant signal is then transmitted to a radio card. After the transmission of the read request signal, the first carrier is kept transmitted to the radio card. Upon reception of the read request signal, the radio card generates a power supply voltage and an operation clock and sends response data to the read request signal to a radio card reader/writer. Unlike in the prior art, therefore, the reception of power or the reception/transmission of data need not be performed intermittently so that a large amount of data can be received or transmitted continuously at a high speed.

2 Claims, 10 Drawing Sheets

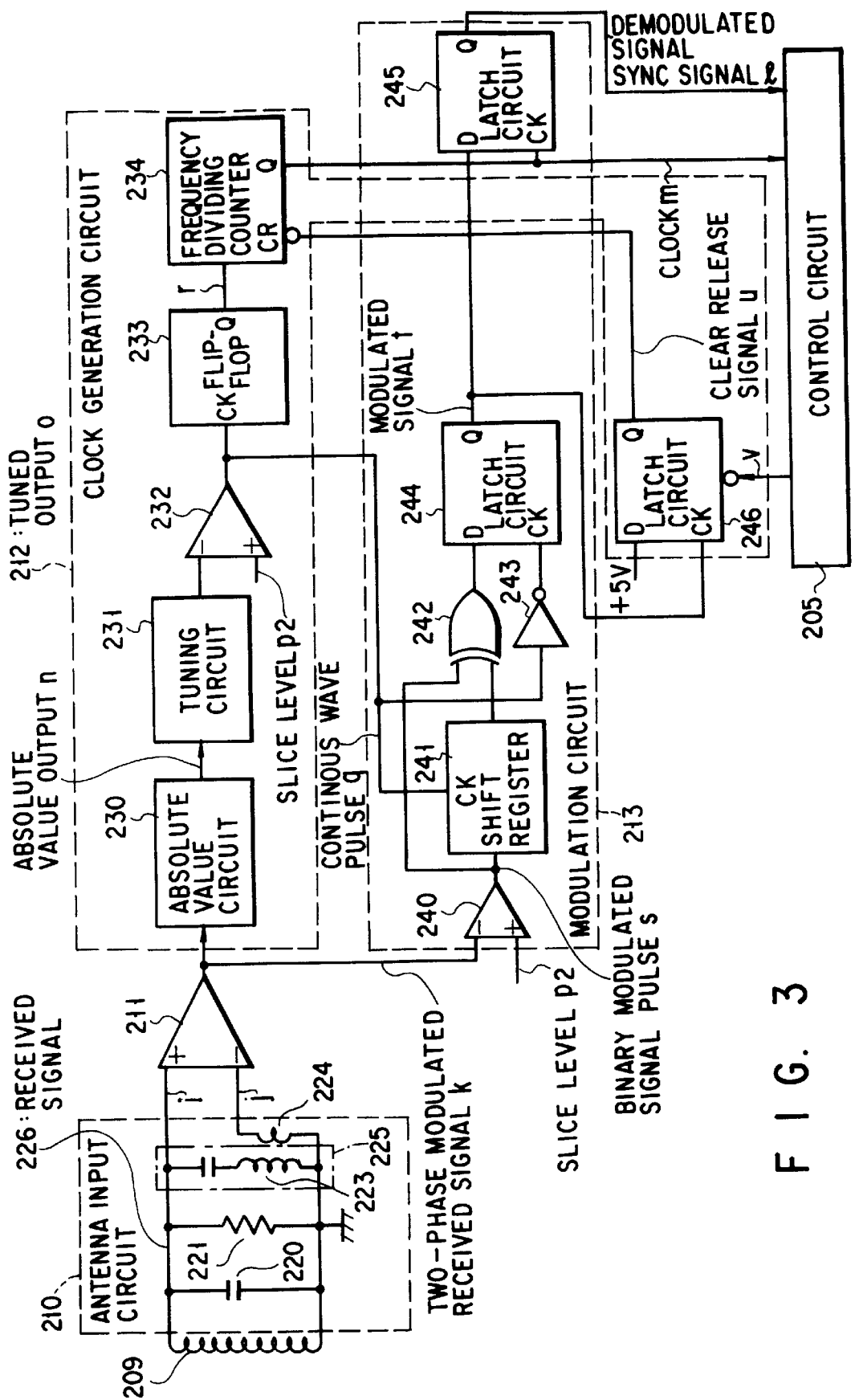
F I G. 3

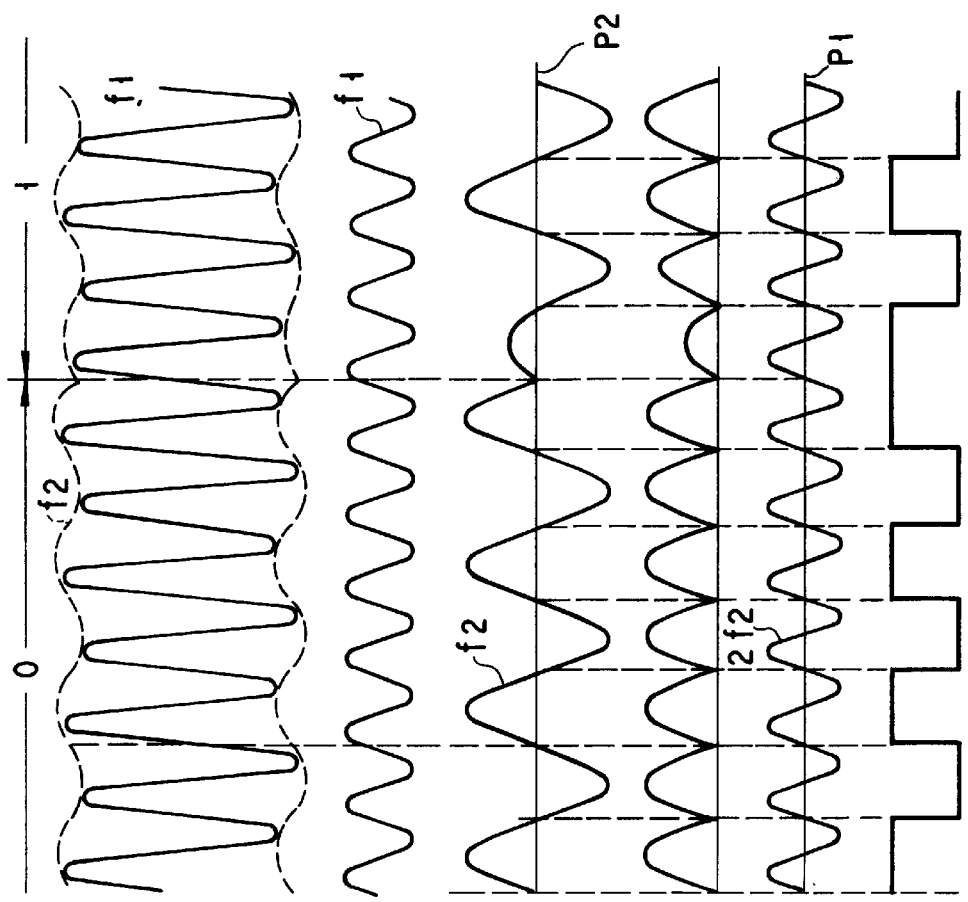

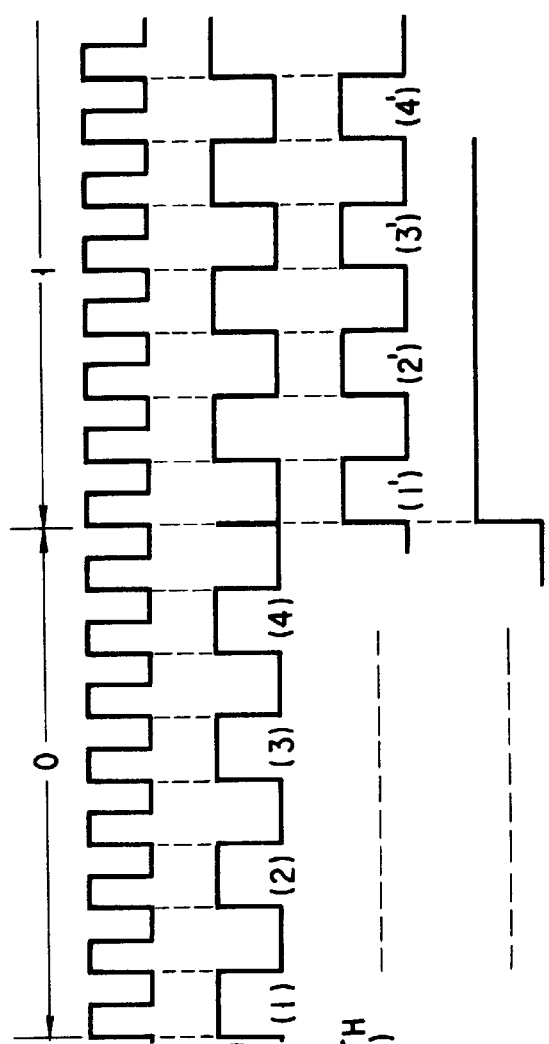
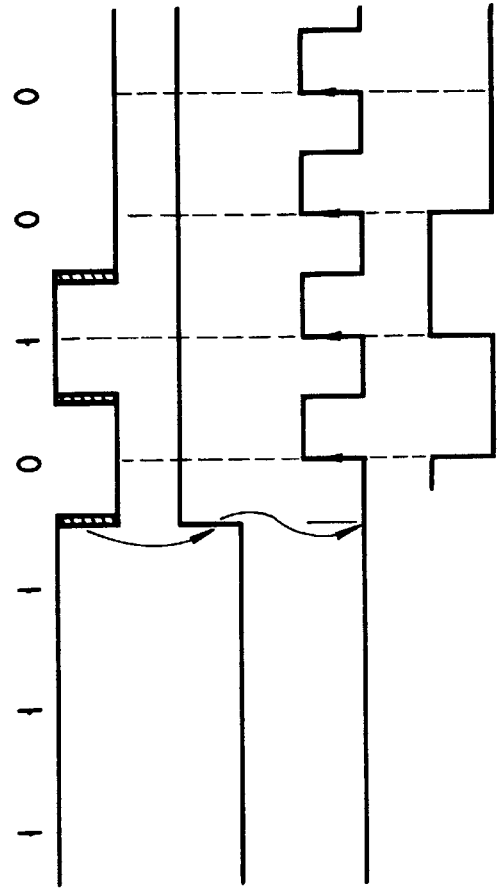
FIG. 5A CONTINUOUS WAVE PULSE (q)
FIG. 5B BINARY MODULATED SIGNAL PULSE (s)
FIG. 5C 1 INFORMATION BIT LENGTH DELAY (SHIFT REGISTER) OUTPUT
FIG. 5D EXCLUSIVE OR OUTPUT
FIG. 6A DEMODULATED OUTPUT (t)
FIG. 6B FREQUENCY DIVIDING COUNTER CLEAR RELEASE SIGNAL (u)
FIG. 6C CLOCK (m)
FIG. 6D DEMODULATED SIGNAL SYNC SIGNAL (ℓ)

FIG. 8A   INFORMATION BIT (d)
FIG. 8B   ACCUMULATED OUTPUT (w)
FIG. 8C   RECEIVED INFORMATION BIT (150)
FIG. 8D   1 INFORMATION BIT DELAY (160)
FIG. 8E   EXCLUSIVE OR OF 150 AND 160 (DEMODULATED OUTPUT)

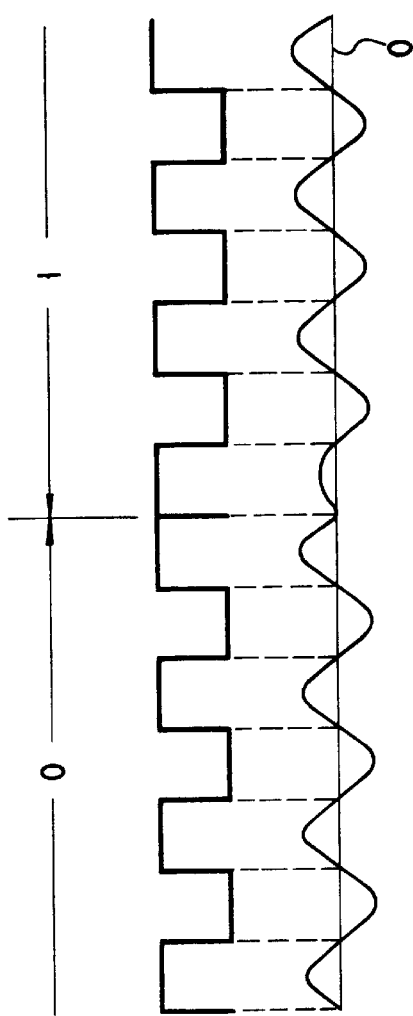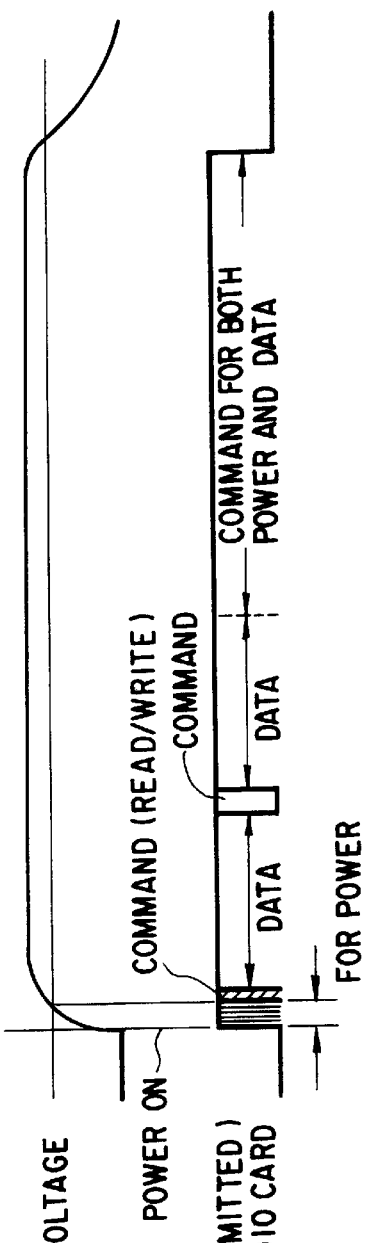

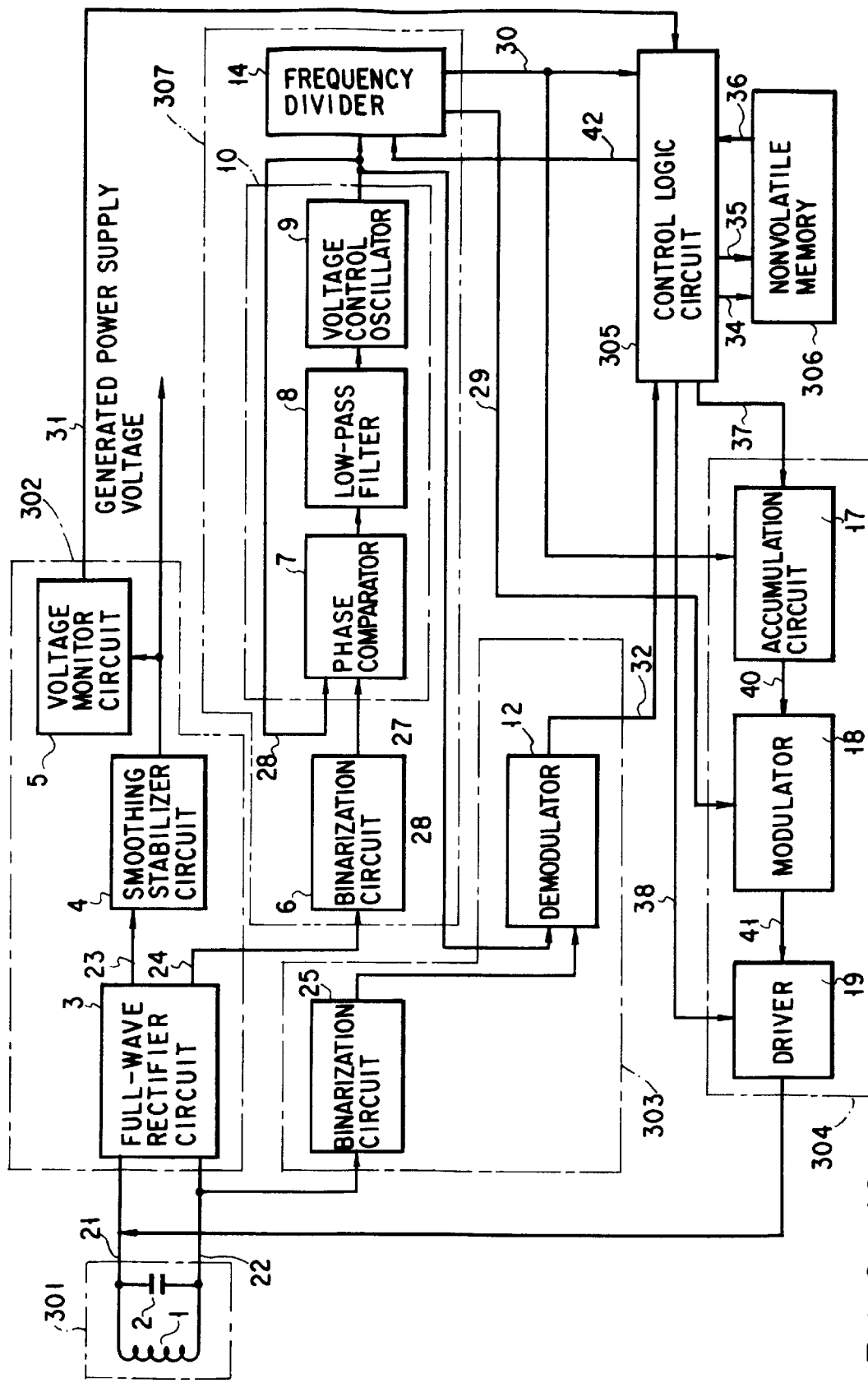
F I G. 10

RADIO CARD COMMUNICATION APPARATUS

BACKGROUND OF THE INVENTION

1. Field of the Invention

The present invention relates to a radio card communication apparatus suitable for a portable radio card reader/writer, which carries out radio communication with a portable radio card having a radio communication function to perform predetermined information processing such as data reading and writing from and to the radio card.

2. Description of the Related Art

Batteryless radio cards and tags have recently been developed as portable data storage media having a radio communication function and putting those radio cards and tags to practical use has started. These data storage media generally perform an intermittent operation of half duplex communications using ASK (Amplitude-Shift Keying) modulation, and the amount of data which can be transmitted during one communication is small.

According to the conventional intermittent communication, a cycle of power reception, data reception and data transmission for generating a power supply voltage in a radio card is repeated every time a small amount of bit data is communicated. For example, a radio card is charged with a power carrier wave (for a predetermined period of time) and receives a command (indicative of reading or writing of data) or performs data reading/writing with an available voltage within the allowable operation voltage range during discharge. In other words, since a predetermined period of time for charging the radio card is always required before the reception of a command or the reading/writing of data, the command reception or data reading/writing cannot be performed continuously. Such intermittent communication thus makes it difficult to continuously receive or transmit a large amount of data at a high speed.

SUMMARY OF THE INVENTION

Accordingly, it is an object of the present invention to provide a radio card communication apparatus which executes radio communication with a portable radio card having a radio communication function and can continuously transmit or receive a vast amount of data at a time at a high speed without intermission.

In order to achieve the above object, according to one aspect of this invention, there is provided a radio card communication apparatus having a transmitting antenna and a receiving antenna for radio communication with a portable radio card having a radio communication function, comprising modulation means for modulating a modulated signal, obtained by modulating a command signal including a command and data, with a first carrier of a predetermined frequency to provide a first modulated carrier signal; transmission means for maintaining the transmission of the first modulated carrier signal to the radio card from the transmitting antenna and transmitting the first carrier to the radio card following transmission of the command signal in order to enable an operation of the radio card; reception means for receiving a response signal, modulated with a second carrier, from the radio card via the receiving antenna in association with the command signal; and means for causing the transmission means to stop transmitting the first carrier when reception of the response signal by the reception means is completed.

According to this invention, the conventional shortcoming associated with intermittent communication is eliminated and a power supply voltage and a clock are produced simultaneously and continuously in a radio card so that a vast amount of data (information bits) is continuously exchanged between the radio card and this apparatus at a high speed.

A radio card reader/writer according to this invention transmits data by the first carrier frequency and receives data by the second carrier frequency phase-synchronous with the first carrier frequency and different from the first carrier frequency. The transmission signal is a first two-phase modulated signal and the reception signal is a second two-phase modulated signal. A data signal is received through the second carrier from a radio card while transmitting the first carrier (to generate a power supply voltage and a clock in the radio card).

Because communication with an external unit becomes possible only by a key operation on an operating section, it is possible to prevent unauthorized access to the radio card from an external system and unauthorized flow of information.

In the case where the radio card reader/writer receives the second carrier while transmitting power on the first carrier to a radio card, the first carrier component in the signal received at the receiving antenna is considerably greater than the second carrier. As the first carrier component is removed before the received signal is amplified in a receiving antenna input circuit section, however, simultaneous transmission and reception are possible.

Further, the receiving antenna input circuit section extracts the first carrier frequency component and subtracts it from the received signal, so that the first carrier frequency component is surely eliminated and only the second two-phase modulated signal is demodulated.

A continuous clock synchronous with the carrier frequency of the received two-phase modulated signal is produced, and the received signal is demodulated immediately in response to this clock.

An efficient transmission driver needed to transmit a two-phase modulated signal is designed with a simple structure. An AND gate is provided at the input section of the transmission driver, so that the input of this driver is disabled when receiving a signal. As a capacitor is connected in series to a load of the transmission driver, the consumed power of this driver can be suppressed to nearly zero at the time of data reception.

Further, because demodulated data has an absolute phase, a phase specifying circuit or the like need not be particularly provided, and the apparatus with a simple circuit structure can operate surely.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 3 is an electric circuit diagram showing the structures of the essential parts of the radio card reader/writer;

FIGS. 4A through 4F are diagrams showing a signal waveform at the principal part of an antenna input circuit, an output waveform of a differential amplifier and signal waveforms at the essential parts of a clock generation circuit;

FIGS. 5A through 5D are diagrams showing signal waveforms at the essential parts of a demodulation circuit;

FIGS. 6A through 6D are diagrams showing signal waveforms at the essential parts of the clock generation circuit and the demodulation circuit;

FIGS. 8A through 8E are diagrams for explaining an information bit and accumulated output in a modulation circuit, and a received information bit, a 1 information bit delay output and an exclusive OR of both in the demodulation circuit;

FIGS. 9A through 9C are diagrams of a two-phase modulated pulse signal and a transmitting antenna coil current with respect to an accumulated output;

FIG. 10 is a block diagram showing the schematic structure of the radio card;

FIGS. 13A and 13B are timing charts for explaining a power supply voltage in a radio card and the received (transmitted) contents of the radio card.

DETAILED DESCRIPTION OF THE PREFERRED EMBODIMENTS

One embodiment of the present invention will now be described with reference to the accompanying drawings.

Figure 1:
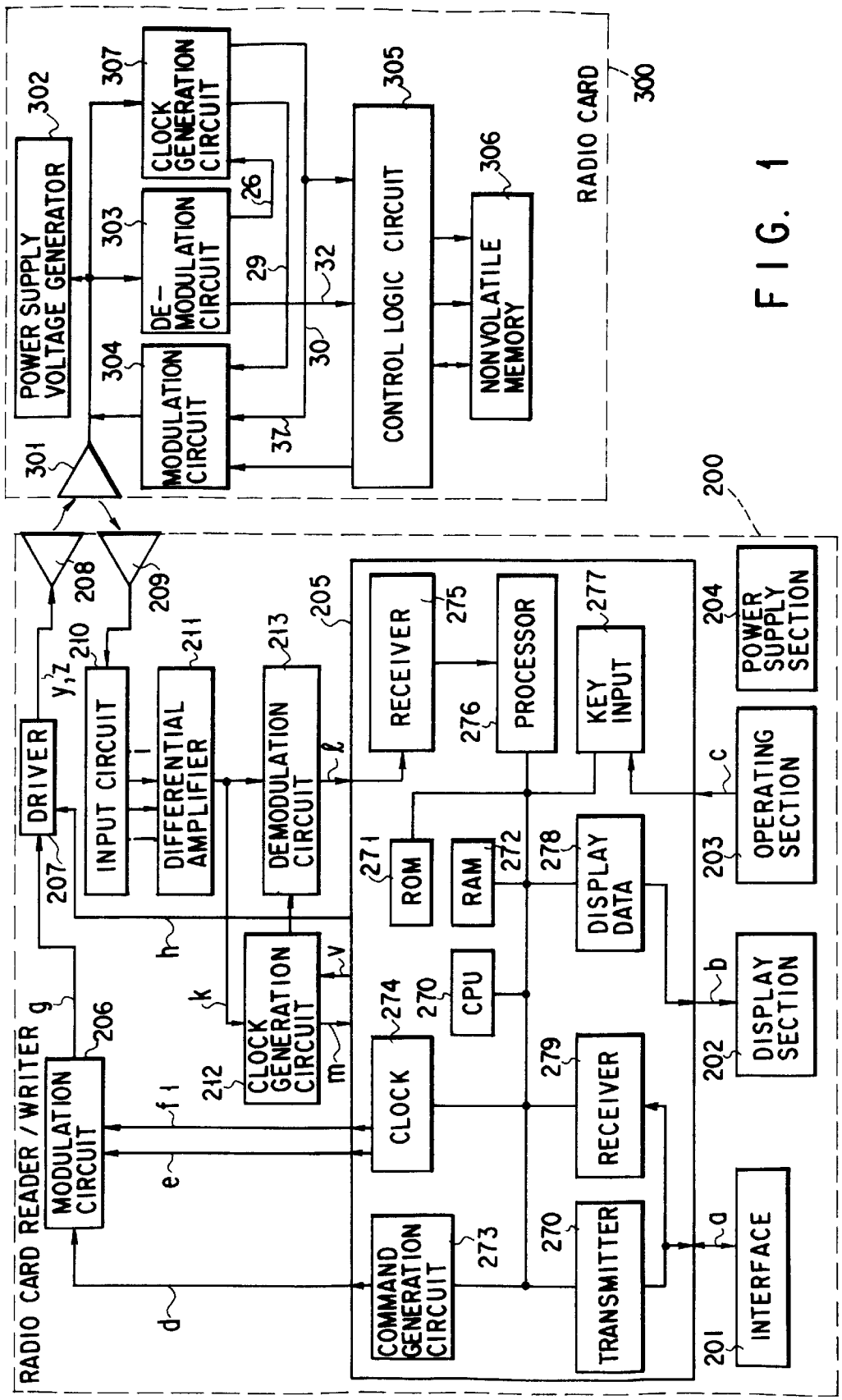
FIG. 1 is a block diagram showing the schematic structure of a radio card system for explaining one embodiment of this invention.

FIG. 1 shows the structure of a radio card system embodying this invention, which uses a radio card as a data storage medium. This radio card system is roughly divided into a radio card reader/writer 200 serving as a radio card communication apparatus and a radio card 300 serving as a portable data storage medium having a radio communication function.

As shown in FIGS. 1 and 2A through 2E, the radio card reader/writer 200 is designed to transmit a read/write (store) command to the radio card 300, process readout data, transmit write data, etc. The radio card reader/writer includes an interface 201 to be connected to an external device (not shown), a display section 202, an operating section 203 like a keyboard, a power supply section 204 made of mainly a battery for supplying operation power supply voltages to the individual sections, a controller 205, a modulation circuit 206, a transmission driver 207, a transmitting antenna 208, a receiving antenna 209, an antenna input circuit 210, a differential amplifier 211 serving as a reception amplifier, a clock generation circuit 212 and a demodulation circuit 213.

The radio card 300 decodes a command transmitted from the radio card reader/writer 200, writes (stores) data, transmits data, etc., and, as shown in FIGS. 1 and 10, includes a parallel tuning circuit 301 having a loop-shaped antenna coil 1 (see FIGS. 10 and 11) serving as a receiving/transmitting antenna and a tuning capacitor 2 (see FIGS. 10 and 11), a power supply voltage generator 302, a demodulation circuit 303, a control logic circuit 305, a modulation circuit 304, a nonvolatile memory 306 constituted of an EEPROM or the like as memory means, and a clock generation circuit 307.

The operations of the radio card reader/writer 200 embodying this invention and the radio card 300 will now be described in detail.

First, the reading of data from the radio card 300 will be explained. The controller 205 of the radio card reader/writer 200 generates a readout command in response to a key input from the operating section and sends it to the modulation circuit 206. The circuit 206 modulates the command by an arbitrary modulation method (two-phase modulation in this embodiment) and transmits the modulated signal to the transmission driver 207. The driver 207 amplifies the modulated signal so as to have a sufficient radiant intensity. The amplified signal is then supplied to the transmitting antenna 208.

The signal supplied to the antenna 208 is emitted in the air and received by the parallel tuning circuit 301 of the radio card 300. The received signal is demodulated by the demodulation circuit 303, and the demodulated signal is supplied to the control logic circuit 305 where its command is analyzed. If the control logic circuit 305 decodes the command as "readout," it reads desired card data from the nonvolatile memory 306, and sends the card data to the modulation circuit 304. The circuit 304 modulates the card data and supplies the modulated data to the parallel tuning circuit 301.

The signal supplied to the parallel tuning circuit 301 is also emitted in the air and received by the receiving antenna 209 of the radio card reader/writer 200. The received signal is sent to the differential amplifier 211 after an undesired signal is eliminated by the antenna input circuit 210. The amplifier 211 amplifies the signal and sends it to the clock generation circuit 212 and the demodulation circuit 213. The demodulation circuit 213 demodulates the received signal using the clock from the clock generation circuit 212. The demodulated signal is supplied to the controller 205 where it is subjected to predetermined processing.

Figure 2:
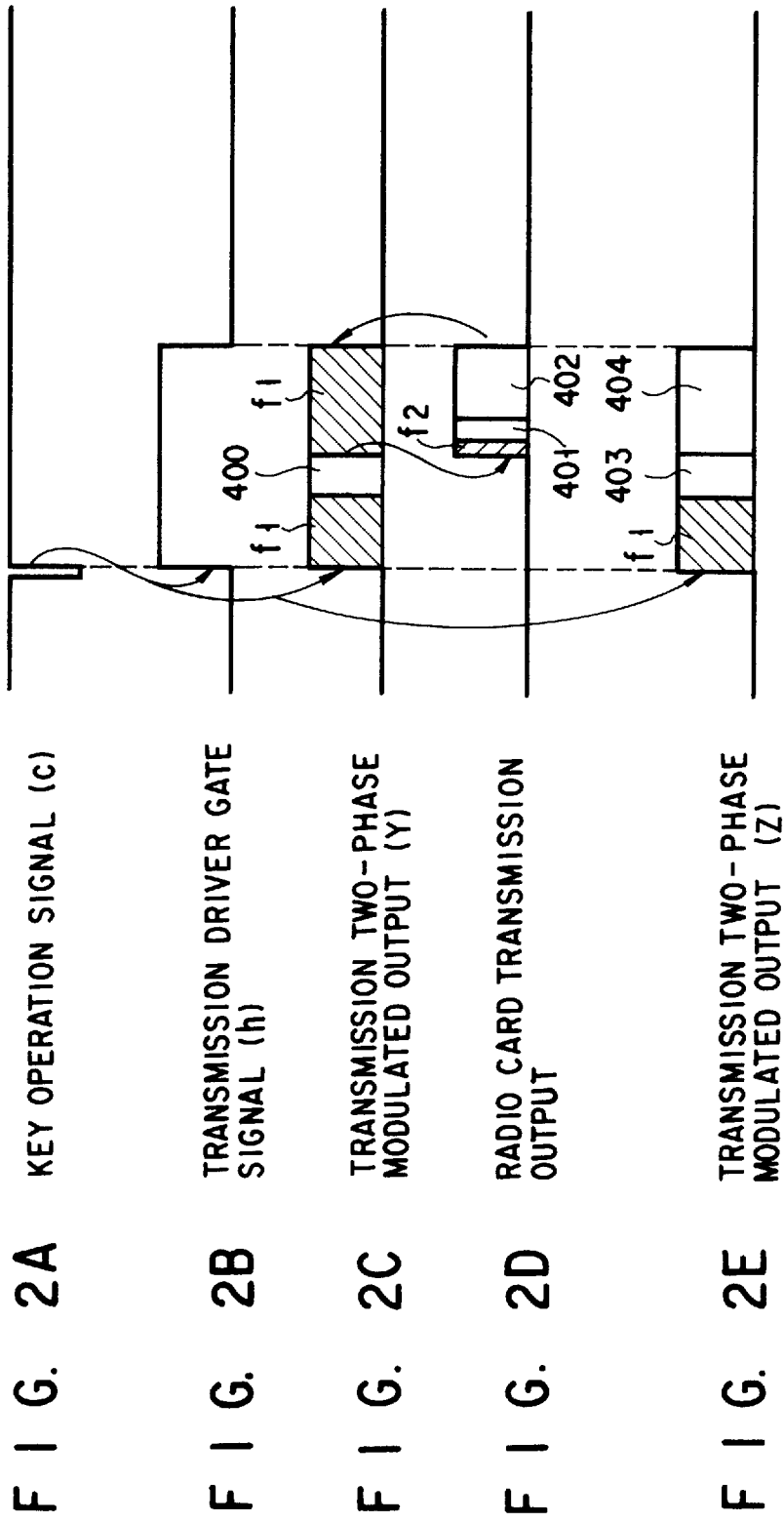
FIGS. 2A through 2E are timing charts illustrating a transmission driver gate signal output in response to a key operation signal from a radio card reader/writer, a transmitted two-phase modulated signal and a transmission output from a radio card.

When the need arises, data can be displayed on the display section 202 and data can be input from the operating section 203. When a key operation corresponding to data reading is performed through the operating section 203, a key operation signal (c) is input to the controller 205 as shown in FIG. 2A. Then, the controller 205 sends a transmission driver gate signal (h) to enable the transmission driver 207 as shown in FIG. 2B to allow for communication, and the driver 207 sends a transmission two-phase modulated wave output (y) shown in FIG. 2C to the radio card 300 via the transmitting antenna 208. As this output (y), data of a reference phase (e.g., an information bit "0") is transmitted on the first carrier of a frequency f1.

The radio card 300 receives the transmission two-phase modulated wave output (y) at the antenna coil 1, causes the power supply voltage generator 302 to generate a power supply voltage and causes the clock generation circuit 307 to generate a clock. Next, a read request signal (command) 400 containing a command and an address is sent from the radio card reader/writer 200. This read request signal 400 is also a signal two-phase modulated by the first carrier. In the radio card 300, the generation of a power supply voltage, clock generation, demodulation, decoding of a command and reading of data from a specified address in the nonvolatile memory 306 are performed. The first carrier of the frequency f1 continues to be transmitted even after the transmission of the read request signal 400. It is therefore possible to keep generating clocks necessary to generate a power supply voltage and return data in the radio card 300.

The radio card 300 produces a continuous clock 28 of the frequency f1 in phase with the received first carrier of the frequency f1. The radio card 300 also returns data after performing two-phase modulation using the second carrier 29 of a frequency f2 which has been frequency-divided by two. The transmission output of the radio card 300 is shown in FIG. 2D. After sending reference-phase data on the second carrier 29 of the frequency f2, the radio card 300 sends a status 401 and desired data 402. The status 401 and desired data 402 have undergone two-phase modulation using the second carrier of the frequency f2. As a power supply voltage and a clock are continuously produced in the radio card 300, the radio card 300 can continuously transmit all data stored in the nonvolatile memory 306 in response to a single read request signal 400.

When the desired data 402 in the transmission output of the radio card 300 is transmitted completely, the transmission of the transmission two-phase modulated wave output (y) from the transmitting antenna 208 by the transmission driver 207 is terminated.

The radio card reader/writer 200 of this invention is designed to communicate with the radio card 300 or with an external device only in response to a key operation through the operating section 203. That is, the communication with the radio card 300 or with an external device is not possible without any key input from the operating section 203. This feature can inhibit non-permitted access to the radio card from an external system.

Next, the writing of data to the radio card 300 will be explained. The controller 205 of the radio card reader/writer 200 generates a write command and write data in response to a key input from the operating section 203, and sends them to the modulation circuit 206. The circuit 206 modulates the command and data by an arbitrary modulation method and supplies the modulated signal to the transmission driver 207. The driver 207 amplifies the modulated signal so as to have a sufficient radiant intensity. The amplified signal is supplied to the transmitting antenna 208.

The signal supplied to the antenna 201 is emitted in the air and received by the parallel tuning circuit 301 of the radio card 300. The received signal is demodulated by the demodulation circuit 303, and the demodulated signal is sent to the control logic circuit 305 where its command is analyzed. If the circuit 305 decodes the command as "write," it writes the write data following the write command at a specified address in the nonvolatile memory 306.

The power supply voltage generator 302 of the radio card 300 generates a power supply voltage for the radio card 300 in response to the signal received by the parallel tuning circuit 301. The clock generation circuit 307 of the radio card 300 generates a clock necessary to operate the individual circuits in response to the signal received by the parallel tuning circuit 301. The clock is supplied to the demodulation circuit 303, modulation circuit 304 and control logic circuit 305.

The transmitting and receiving antennae 208 and 209 of the radio card reader/writer 200 have to be located close to each other and opposite to the parallel tuning circuit 301 of the radio card 300. The transmitting antenna 208 transmits a signal with a high intensity to the radio card 300. The receiving system of the radio card reader/writer 200 is designed to have a high sensitivity since it needs to receive a faint signal from the radio card 300.

The detailed construction of the radio card reader/writer 200 according to this invention will be described below with reference to FIGS. 1, 3 and 4A through 4F.

As shown in FIG. 1, the controller 205 includes a CPU 270, a ROM 271, a RAM 272, a read/write command generation section 273, a clock generation circuit 274, a data receiving section 275, a a data processor 276, a key data input section 277, a display data output section 278, a data receiving section 279 for receiving data from an external device, and a data transmitting section 280 for transmitting data to an external device.

The reference clock generation circuit 274 outputs the first carrier of the frequency f1 for phase modulation and a data clock (e) having a frequency obtained by dividing the frequency f1. The read/write command generation section 273 generates a read request signal including a read command and its associated address, and a write request signal including a write command and its associated address. Those request signals are output as information bits (d) to the modulation circuit 206.

The controller 205 knows the allowable storage capacity for reception data (including check data or the like) in association with the read request signal. When the amount of demodulated output data from the demodulation circuit 213 reaches the allowable capacity, therefore, "0" is output as the transmission driver gate signal (h), inhibiting the driver 207 from sending the transmission two-phase modulated wave output (transmission of a signal carried on the first carrier).

The operating section 203 generates a key input signal indicative of communication with the radio card in accordance with the key operation by an operator. The interface section 201 provides the interface with an external device. The power supply section 204 is constituted of a rechargeable battery to make this radio card reader/writer 200 portable.

The antenna input circuit 210 comprises a parallel resonance circuit, which has the antenna coil 209, a capacitor 220 and a resistor 221 connected in parallel, and a series tuning circuit 225, which has a capacitor 222 and a coil 223 connected in series, as shown in FIG. 3. The series tuning circuit 225 is designed so that the impedance becomes 0 when tuned.

The antenna input circuit 210 tunes to the received signal (the second carrier of the frequency f2) by means of the antenna coil 209 and the capacitor 220 and adjusts its frequency selectivity characteristic (Q) for the reception of a two-phase modulated signal by means of the resistor 221. The series tuning circuit 225 having the capacitor 222 and coil 223 is connected to receiving terminals i and j of the antenna coil 209. The tuning frequency of this series tuning circuit 225 is the frequency f1 of the first carrier. This setting allows the frequency f1 component of the first carrier received at the antenna coil 209 to be eliminated by the series tuning circuit 225.

It is apparent from FIG. 4A that the first carrier frequency f1 component of a signal 226 received from the radio card 300 when power of the frequency f1 component of the first carrier is being transmitted has a significantly greater amplitude than the second carrier frequency f2 component of the desired received two-phase modulated wave signal. Thus, the desired received two-phase modulated wave signal cannot be extracted simply by amplifying the received signal by an amplifier using the conventional parallel tuning circuit.

According to this invention, the series tuning circuit 225 is incorporated in the antenna input section 210 as a circuit to remove the first carrier frequency f1 component. As a result, a two-phase modulated wave signal (k) of the second carrier of the frequency f2 as shown in FIG. 4C can be obtained as the output of the differential amplifier 211.

Further, an extracted signal (j) having only the frequency f1 component of the first carrier as shown in FIG. 4B is obtained via a second coil 224 closely coupled to the coil 223. The first carrier frequency f1 component can be removed completely by subtracting the extracted signal (j) from the received signal by means of the differential amplifier 211.

The clock generation circuit 212 comprises an absolute value circuit 230, a tuning circuit 231, a comparator 232, a flip-flop circuit (FF circuit) 233, a frequency dividing counter 234 and a latch circuit 246, as shown in FIG. 3.

The absolute value circuit 230 obtains the absolute value of the two-phase modulated wave signal (k) from the differential amplifier 211 and outputs the absolute value (n) as shown in FIG. 4D to the tuning circuit 231. As this absolute value output (n) is transmitted in a limited band, sufficient transmission is not performed at the portion where the phase is changed (data changing portion) so that some data is generally lost (the amplitude is low).

By putting the absolute value output (n) through the tuning circuit 231 having a high selectivity (Q), a continuous frequency 2f2 can be attained as the output (o) of the tuning circuit 231. This output (o) has a frequency twice as high the frequency f2 of the second carrier and is thus free of noise. The output (o) of the tuning circuit 231 is supplied to the comparator 232.

The comparator 232 binarizes the output (o) of the tuning circuit 231 at a slice level P1 and outputs a continuous wave pulse (q) shown in FIG. 5A. The continuous wave pulse (q) from the comparator 232 is supplied to the clock input terminal CK of the FF circuit 233 and to the clock input terminal CK of a shift register in the demodulation circuit 213, which will be discussed later.

The FF circuit 233 reduces the frequency of the continuous wave pulse (q) to a half, and sends its output to the frequency dividing counter 234. The counter 234 has a clear terminal CR to which the latch output (clear release signal (u)) from the latch circuit 246 is supplied. The counter 234 starts operating to frequency-divide the set output of the FF circuit 233 in response to the latch output (clear release signal (u)) from the latch circuit 246. The frequency-divided output, m, of the counter 234 is supplied to the clock terminal CK of a latch circuit 245 in the demodulation circuit 213 (which will be described later) and the controller 205.

The latch circuit 246 latches 5 V at the transition point (i.e., the edge of the status information bit from the reference-phase modulated data) of the demodulated output (t) from a latch circuit 244 as shown in FIG. 6A, and outputs the clear release signal (u) as shown in FIG. 6B for the frequency dividing counter 234.

In response to this clear release signal (u), the counter 234 starts counting and frequency-divides the set output of the FF circuit 233 by the number of waves of the received carrier occupying one information bit (eight in this example). At the rising of a clock (m) produced by the counter 234 as shown in FIG. 6C, the latch circuit 245 synchronizes the modulated output (t) from the latch circuit 244 with the clock (m) to yield a modulated signal synchronized output (l) synchronized with the clock (m) as shown in FIG. 6D.

It is therefore possible to prevent the modulated output (t) from the latch circuit 244 from becoming unstable due to transmission distortion at the transition point of the information bit b as indicated by the hatched area. When demodulation is completed, a control signal v is supplied to the latch circuit 246 from the controller 205, clearing the latch circuit 246.

The demodulation circuit 213 comprises a comparator 240, a shift register 241, an EX-OR gate 242, an inverter circuit 243, the latch circuit 244 and the latch circuit 245.

The comparator 240 slices the two-phase modulated wave signal (k) output from the differential amplifier 211 at a slice level P2 which slices the center of the waveform to generate binary modulated signal pulse (s) shown in FIGS. 4F and 5B as a binarized output. This binary modulated signal pulse (s) is supplied to the shift register 241 and one end of the EX-OR gate 242.

The shift register 241 generates a signal (FIG. 5C) obtaining by delaying the binary modulated signal pulse (s) (FIG. 5B) from the comparator 240 by one information bit length in response to the output (q) (FIG. 5A) of the comparator 232. The EX-OR gate 242 obtains an exclusive-OR of the binary modulated signal pulse (s) and the shift register output (FIG. 5C). The output of the EX-OR gate 242 is latched by the latch circuit 244 which in turn generates a demodulated signal (t) as its latch output and sends it to the latch circuit 245. The latch circuit 245 latches the latch output of the latch circuit 244 in response to the frequency-divided output (m) of the frequency dividing counter 234 and sends a demodulated signal sync signal l as the demodulation result to the controller 205.

Figure 7:
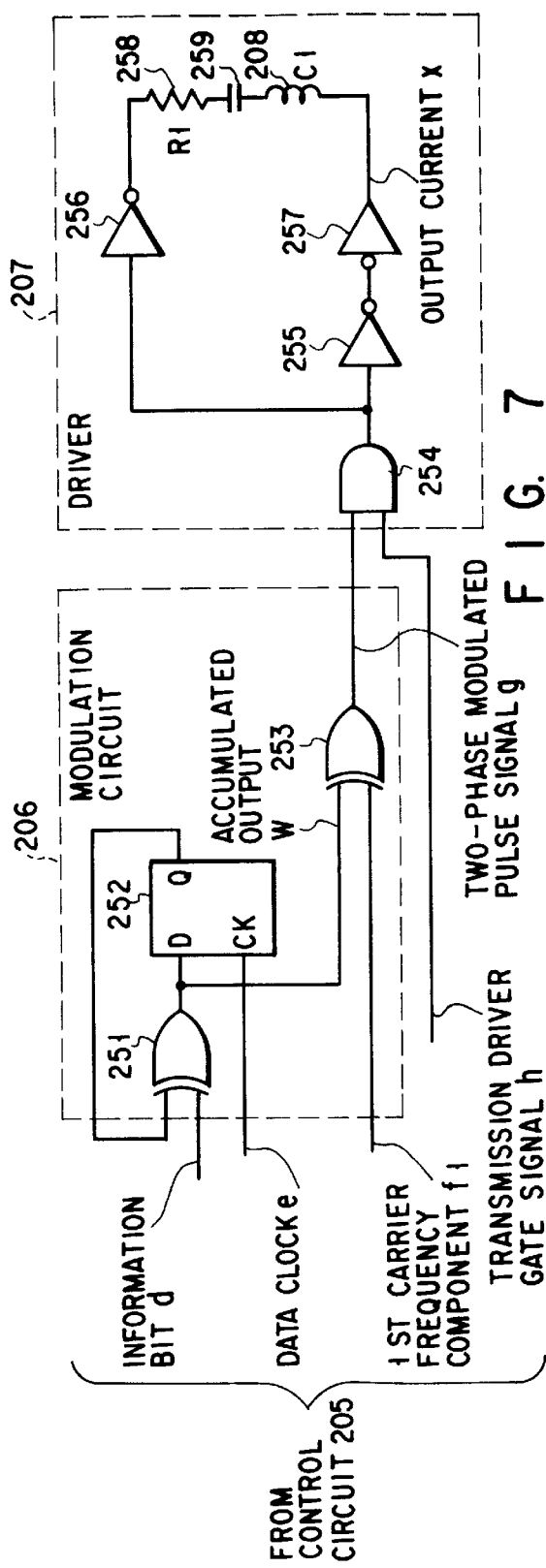
FIG. 7 is an electric circuit diagram showing the structures of the essential parts of a radio card reader/writer.

The modulation circuit 206 comprises an EX-OR gate 251, a D flip-flop circuit (FF circuit) 252 and an EX-OR gate 253, as shown in FIG. 7.

The EX-OR gate 251 obtains an exclusive-OR of the information bit (d) from the controller 205 and the set output of the FF circuit 252. The FF circuit 252 latches the output of the EX-OR gate 251 in accordance with a data clock (e) from the controller 205. The EX-OR gate 251 and FF circuit 252 constitute an accumulation circuit. The EX-OR gate 253 obtains an exclusive-OR of the accumulated output (w) (FIG. 8B) of the EX-OR gate 251 and the transmitted signal (the first carrier of the frequency f1) from the controller 205. As a result, the EX-OR gate 253 outputs a two-phase modulated pulse signal (g) as shown in FIG. 9B with respect to the accumulated output (w) as shown in FIG. 9A.

FIG. 8B shows the accumulated output (w) obtained by the accumulation of the information bit (d) in FIG. 8A by disregarding the carry-up. That is, the EX-OR gate 251 outputs an exclusive-OR of the output of the FF circuit 252 and the information bit (d) and the FF circuit 252 delays the exclusive-OR output by one information bit length in response to the data clock (e). Consequently, the EX-OR gate 251 outputs the accumulated output (w). The EX-OR gate 253 receives the accumulated output (w) and the pulse of the first carrier frequency f, performs two-phase modulation and outputs a two-phase modulated pulse signal (g). This two-phase modulated pulse signal (g) is sent to the transmission driver 207 to be transmitted.

The driver 207 comprises an AND gate 254, an inverter circuit (logic gate) 255 having an inverting function, inverter circuits (a logic gate and logic inverter) 256 and 257 having a buffer function, a resistor 258 and a capacitor 259, as shown in FIG. 7.

The AND gate 254 performs an AND operation of the two-phase modulated pulse signal (g) from the EX-OR gate 253 and the transmission driver gate signal (h) from the controller 205. The AND gate 254 supplies the two-phase modulated pulse signal (g) shown in FIG. 9B to the inverter circuits 255 and 256 while the transmission driver gate signal (h) is "1." The output of the inverter circuit 255 is supplied to the inverter circuit 257.

Accordingly, the two inverter circuits 255 and 257 perform a push-pull operation on the two-phase modulated pulse signal (g) to efficiently drive the transmitting antenna coil 208. FIG. 9C shows a current (x) running across the coil 208 with respect to the two-phase modulated pulse signal (g) shown in FIG. 9B.

The series circuit of the transmitting antenna coil 208 and the capacitor 259 tunes to the frequency f1 component of the first carrier. Because the inverter circuits 256 and 257 are driven by voltages, their output impedance is sufficiently small. The level of the output current (x) or the level of the current across the coil 208 is determined as a value obtained by dividing the output voltage (5 V) of the inverter circuits 256 and 257 by the resistance, R1, of the resistor 258. This means that it is only the resistor 258 which restricts the current because the series resonance (tuning) impedance at the tuning frequency f1 becomes zero.

The frequency selectivity characteristic (Q) of the output of the transmitting antenna coil 208 is determined by $2\pi f1 L1/R1$. Therefore, the necessary frequency selectivity characteristic (Q) and the desired transmission current (x) for the transmission of the two-phase modulated wave signal at the desired information bit transfer rate are determined by the resistance R1 of the resistor 258 and the inductance L1 of the coil 208.

When the transmission driver gate signal (h) is set to "0," the inverter circuit 256 is disabled and the inverter circuit 257 remains enabled. As the DC component of the load is inhibited by the capacitor 259, the drive current becomes zero. It is thus possible to set the consumed power of the transmission driver 207 to almost zero.

The signal resulting from the accumulation in the radio card 300 and transmitted as the two-phase modulated wave signal is input to the demodulation circuit 215 of the radio card reader/writer 200. The demodulation circuit 213 shown in FIG. 3 obtains an exclusive-OR of a received information bit 150 and one information bit delayed output 160 to generate a modulated output as shown in FIGS. 8A to 8E. Since this modulated output becomes the same as the information bit (d), the absolute phase of the information bit at the time of transmission is saved.

By adapting such modulation and demodulation systems to the radio card 300 and the radio card reader/writer 200, the absolute phase of the demodulated received information bit (received data) is kept in both apparatuses. While the absolute phase of a two-phase modulated wave signal if modulated by the general method is not known, the present invention can overcome this shortcoming. That is, this invention eliminates the need for a phase specifying circuit. With regard to return data from the radio card 300, particularly, it is desirable to send the minimum data requested. In this case, if the absolute phase is kept, the received data can be processed immediately in the controller 205.

The detailed structure of the radio card 300 will now be described with reference to FIGS. 1, 10, 11 and 12.

As shown in FIG. 10, the parallel tuning circuit 301, which includes the loop-shaped antenna coil 1 and the tuning capacitor 2, receives a two-phase modulated wave signal of the frequency f1 (corresponding to the first carrier of the aforementioned frequency f1) from the transmitting antenna 201 of the radio card reader/writer 200. The circuit 301 also transmits a two-phase modulated wave signal of the carrier frequency f½ (corresponding to the second carrier of the afore-mentioned frequency f2) using a transmission driver 19 (which will be described later). In the parallel tuning circuit 301, the loop-shaped antenna coil 1 should transmit a signal at the carrier frequency f½ at the same time when it receives a signal of the carrier frequency f1 to efficiently secure electric power for generating a power supply voltage from the received radio wave. Therefore, the parallel tuning circuit 301 is so designed as to be tuned to the carrier frequency f1 of the received two-phase modulated wave signal.

Upon reception of the two-phase modulated wave signal from the parallel tuning circuit 301, the power supply voltage generator 302 generates a power supply voltage to be applied to all the circuits in the radio card 300. The generator 302 includes a full-wave rectifier circuit 3 having first and second full-wave rectifier circuits 3a and 3b for the full-wave rectification of the two-phase modulated wave signal, a smoothing stabilizer circuit 4 for smoothing a full-wave rectified signal 24 output from the first full-wave rectifier circuit 3a using smoothing capacitors C1 and C2, and a voltage monitor circuit 5 for monitoring the generated power supply voltage, 20, from the smoothing stabilizer circuit 4. The voltage 20 is 3 V.

The first full-wave rectifier circuit 3a is constituted of diodes D1 to D4, while the second full-wave rectifier circuit 3b is constituted of D1, D2, D5 and D6. The diodes D1 and D2 are shared by the two rectifier circuits 3a and 3b. The circuits 3a and 3b are connected to both ends of the parallel tuning circuit 301, and respectively output full-wave rectified signals 23 and 24.

The full-wave rectifier circuits 3a and 3b include two pairs of diode bridges having two common diodes whose anodes are grounded. While the output of the first full-wave rectifier circuit 3a is smoothed and used to generate a power supply voltage, the output of the second full-wave rectifier circuit 3b is used for the generation of a clock signal.

For the smoothing stabilizer circuit 4, a series regulator or a shunt regulator is employed since received power greatly varies according to the distance between the j300 and the radio card reader/writer 200.

Since a two-phase modulated wave signal is used as a received modulated wave signal to always receive a carrier wave from the parallel tuning circuit 301 and always generate a power supply voltage, the capacitances of the smoothing capacitors C1 and C2 can be reduced, with the result that the radio card 300 can be made thinner and the rising time of the operation can be shortened.

The generated power supply voltage 20 output from the smoothing stabilizer circuit 4 is monitored by the voltage monitor circuit 5 constituted of a comparator (not shown) and the like. When the voltage 20 becomes a value of 2.7 V or higher which is sufficient to stably operate the associated circuits in the radio card 300, the circuit 5 supplies "1" to the control logic circuit 305 as an output 31. When the voltage is lower than 2.7 V, it supplies "0" to the circuit 305 as an output 31 based on the hysteresis characteristic (provided by a capacitor or the like).

When the control logic circuit 305 receives "1" as the output 31 from the voltage monitor circuit 5, it releases a system clear. When the control logic circuit 305 receives "0," it clears the system. It is thus possible to prevent the control logic circuit 305 in the radio card 300 from malfunctioning.

Since the smoothing capacitor C1 is the load of the first full-wave rectifier circuit 3a, the full-wave rectified signal 23 therefrom is a DC voltage including a ripple.

The frequency of the full-wave rectified signal 24 from the second full-wave rectifier circuit 3b is twice as high as that of the voltage received at both ends of the loop-shaped antenna coil 1, and the signal 24 and the received voltage are synchronized with each other.

Since the forward resistance value of diodes D1, D2, D5 and D6, which are rendered in a conductive state, is considerably lower than the resistance (R1+R2), the load of the parallel tuning circuit 301 becomes the value (R1+R2).

Given that the tuning frequency is f1, the −3 dB bandwidth is ±Δf, and the inductance of the antenna coil 1 is L, the value Q, which determines the selectivity characteristic of the parallel tuning circuit 301, is expressed as follows:

$$Q = f_1/2\Delta f \approx (R1+R2)/(2\pi f1 L)$$

As is apparent from this equation, the selectivity of the circuit 301 can be determined by the resistance (R1+R2).

If the frequency bandwidth of the parallel tuning circuit 301 is narrow when the circuit 301 receives a two-phase modulated wave signal as a power supply voltage, the envelope of the carrier f1 greatly varies in the transition of phases (i.e., points where data "0" and "1" change to each other), which raises a problem in generating the power supply voltage. To correctly receive the demodulation circuit, a predetermined bandwidth has to be secured. This bandwidth can be secured by adjusting the resistance (R1+R2).

The demodulation circuit 303 is intended to demodulate the two-phase modulated wave signal received by the parallel tuning circuit 301 and, as shown in FIG. 10, includes a binarization circuit 11 and a demodulator 12.

Figure 11:
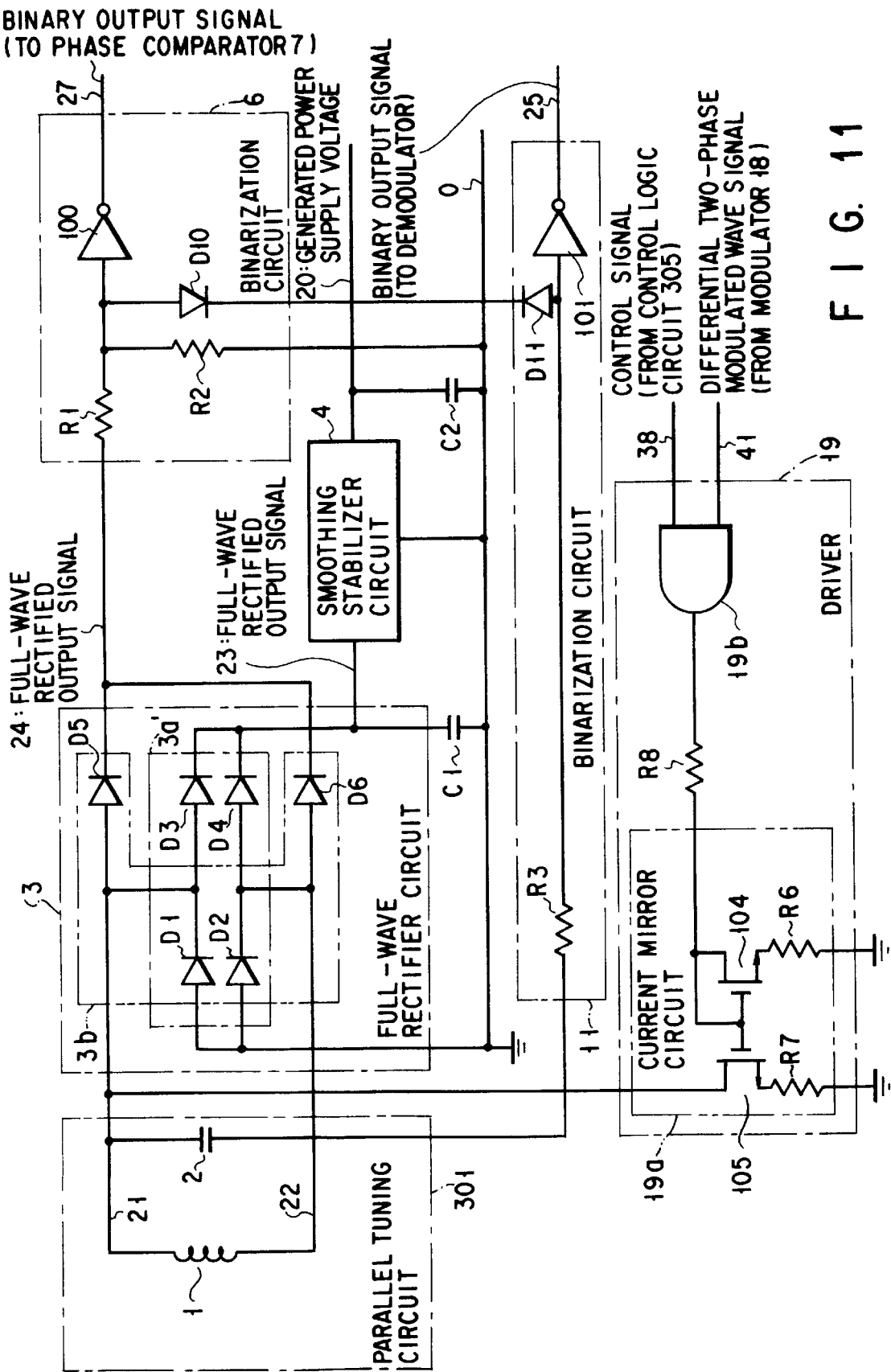
FIG. 11 is an electric circuit diagram showing the structures of the essential parts of the radio card.

The binarization circuit 11 binarizes the two-phase modulated wave signal received by the parallel tuning circuit 301 and includes a resistor R3 whose resistance is higher than that of each of resistors R1 and R2, a diode D11, and a logic gate (inverter) 101 having a hysteresis function, as shown in FIG. 11. The input terminal of the logic gate 101 is connected to a voltage terminal 22 of the parallel tuning circuit 301 via the resistor R3 and to the generated power supply voltage 20 via the diode D11.

The waveform of the two-phase modulated wave signal generated between the terminals 21 and 22 of the parallel tuning circuit 301 varies 180 degrees in phase with respect to data bits "0" and "1." Since the transmission from the antenna 201 of the radio card reader/writer 200 and the reception by the parallel tuning circuit 301 in the radio card 300 are performed within a limited narrow bandwidth, the waveform cannot be correctly formed but is broken or distorted in the phase transition.

With the full-wave rectifier circuit 3 connected to both terminals 21 and 22 of the parallel tuning circuit 301, the voltage at the terminal 22 has a positive half wave as observed from the point of the reference (ground) potential 0. The peak value of this waveform is larger than the 3 V of the power supply voltage 20.

To obtain a smoothly stabilized power supply voltage 20 of 3 V from the received two-phase modulated wave signal, about 6 V is required as the peak value of the voltage at the terminal 22. As the transmission distance between the radio card 300 and the radio card reader/writer 200 becomes shorter, however, the peak value is increased. In this case, the amplitude of the signal input to the logic gate 101 is made larger than that of the power supply voltage at the logic gate 101, which may damage the gate 101 and its subsequent stage.

To prevent this damage, when the terminal voltage 22 is higher than the 3-V power supply voltage 20, the current flows in which direction the capacitor C2 connected to the power supply voltage 20 is charged through the resistor R3 and diode D11. Thus, the input of the logic gate 101 is clamped, and excess power is returned to the power supply voltage 20, thereby protecting the subsequent stage.

Assume that the resistance of the resistor R3 is considerably larger than that of each of the resistors R1 and R2 so as not to influence the selectivity characteristic of the parallel tuning circuit 301. Since the logic gate 101 is operated on the 3-V power supply voltage, the threshold voltage of the input is approximately 1.5 V. The peak value of the terminal voltage 22 is 6 V or higher so that the two-phase modulated wave signal generated at both terminals 21 and 22 is binarized with the threshold value close to the midamplitude of the signal. The input voltage of the logic gate 101, which exceeds the power supply voltage, is applied through the resistor R3 and diode D11 in the direction which contributes to the generation of the power supply voltage.

The clock generation circuit 307 includes a binarization circuit 6, PLL circuit 10 and frequency divider 14 as shown in FIG. 10. The binarization circuit 6 has resistors R1 and R2, a diode D10 and a logic gate 100 as shown in FIG. 11.

The voltage of the full-wave rectified signal 24 of the second full-wave rectifier circuit 3b is divided by the resistors R1 and R2, and the waveform whose amplitude has been reduced is input to the logic gate 100. If the resistances of the resistors R1 and R2 are the same, the waveform whose amplitude is half of that of the full-wave rectified signal 24 from the second full-wave rectifier circuit 3b is input to the logic gate 100, and the signal is binarized at the threshold voltage of about 1.5 V which is half the power supply voltage of 3 V. The binary output, 27, of the logic gate 100 is supplied to the PLL circuit 10.

Referring to FIG. 10, the PLL circuit 10 includes a phase comparator 7, low-pass filter 8 and voltage controlled oscillator 9. The binary signal 27 of the logic gate 100 of the binarization circuit 6 is a pulse having the frequency 2f1 which is twice as high as the carrier frequency f1 of the received two-phase modulated wave signal. This binary signal 27 cannot be used directly as a clock for synchronous detection or data processing since, as mentioned earlier, a pulse is missing in the transition of data bits "0" and "1" where the phase of the two-phase modulated wave signal changes 180 degrees.

The PLL circuit 10 therefore generates a continuous wave pulse 28, which is synchronous with the binary signal 27. In other words, the phases of the binary output 27 of the binarization circuit 6 and the output pulse 28 of the voltage controlled oscillator 9 are compared with each other by the phase comparator 7 at the timing of the falling edge. The output of the phase comparator 7 is converted to a DC voltage in the low-pass filter 8, and the frequency and phase of the oscillation output pulse (continuous wave pulse) 28 are controlled by the DC voltage. As a result, the phase of the output pulse 28 is synchronized with that of the binary output 27 of the logic gate 100 at the timing of the falling edge and the frequency thereof is equal to that of the pulse 27. The output pulse 28 is a continuous wave pulse which is phase-synchronized with the frequency twice as high as the carrier frequency f1 of the two-phase modulated wave signal and is free of any missing part.

The continuous wave pulse 28 is supplied from the voltage controlled oscillator 9 to the phase comparator 7, frequency divider 14 and demodulator 12.

Figure 12:
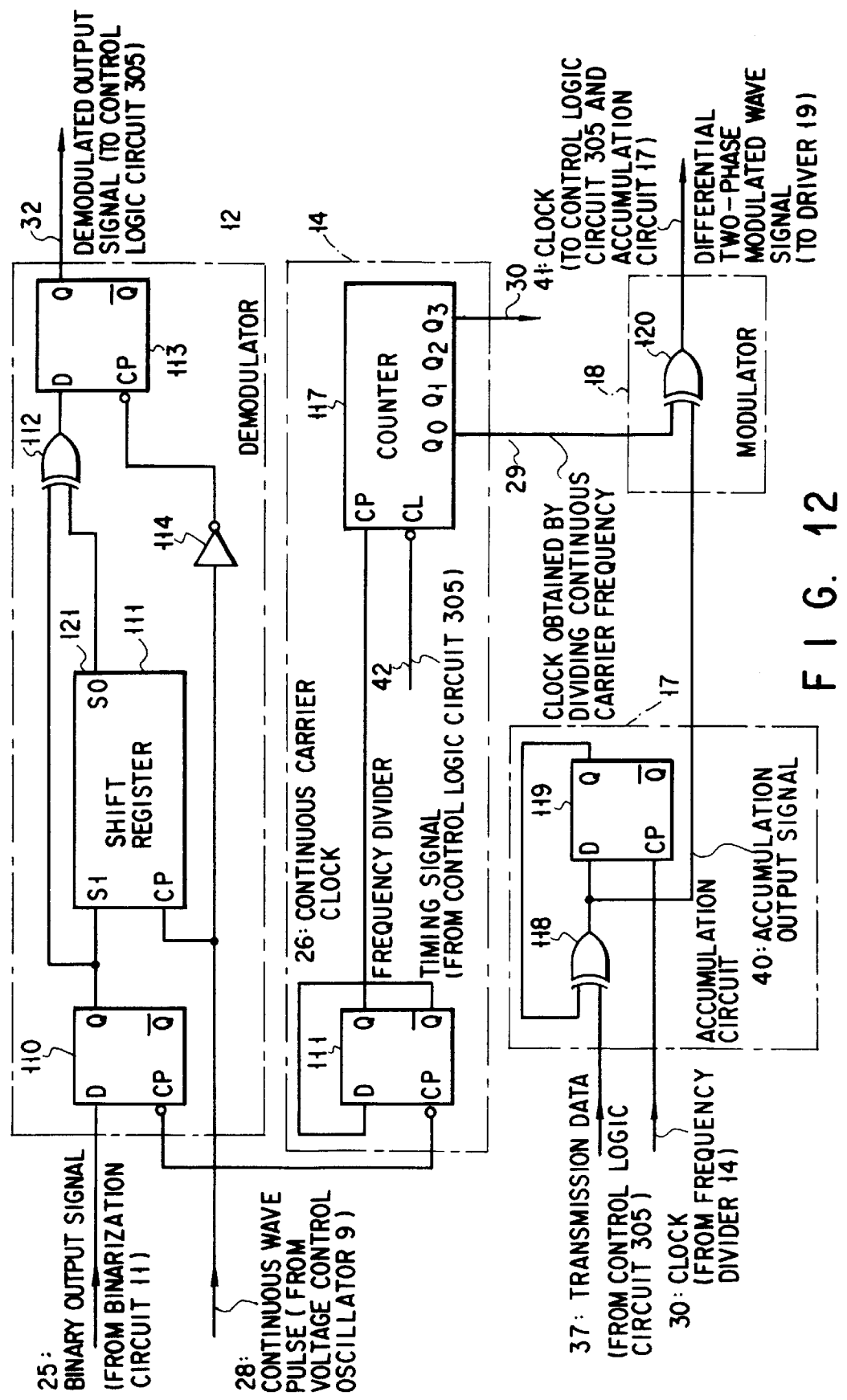
FIG. 12 is an electric circuit diagram showing the structures of the essential parts of the radio card.

The frequency divider 14 includes a D flip-flop circuit (FF circuit) 111, which divides the frequency of the continuous wave pulse 28 of a frequency 2f0 produced by the voltage controlled oscillator 9 of the PLL circuit 10, and a counter 117 for performing 1/16 frequency division on the received frequency-divided (½) pulse f0, as shown in FIG. 12.

Data bit "0" continues for a while from the beginning of data transmission from the radio card reader/writer 200 to generate a power supply voltage. If a starting bit "1" for starting the operations of the control logic circuit 305 and the nonvolatile memory 306 is demodulated after a sufficient period of time (about several milliseconds) required for locking the PLL circuit 10, the counter 117 receives a clear signal 42 ("1") at the timing of the rising edge of the starting bit "1" and is released from the clear state, thus starting the frequency division.

Consequently, a demodulated signal 32 is synchronized at the timing of the rising edge of the Q3 output 30 of the counter 117, and data can be written in the nonvolatile memory 306. In this embodiment, however, the number of carrier waves per data bit is sixteen. The Q3 signal 30 from the counter 117 of the frequency divider 14 is supplied to an accumulation circuit 17 of the demodulation circuit 304 and the control logic circuit 305. A Q0 signal 29 output from the counter 117 is supplied to a demodulator 18 of the demodulation circuit 304.

An operation of performing two-phase modulation of data bit (transmission data) 37 read from the nonvolatile memory 306 and the transmitting of the modulated data to the radio card reader/writer 200 will now be discussed.

Upon reception of a command and an address, the radio card 300 reads data from the specified address in the memory 306, and modulates and transmits it as transmission data 37.

As shown in FIG. 11, the driver 19 is used to drive the parallel tuning circuit 301 in response to a differential two-phase modulated wave signal 41 and is constituted of a current mirror circuit 19a having resistors R6 and R7 and MOS transistors 104 and 105, an AND gate 19b, and a resistor R8. The AND gate 19b is supplied with the signal 41 and the control signal 38 which becomes "0" when the nonvolatile memory 306 is in write mode. The resistance of the resistor R7 is set lower than that of the resistor R6.

The output of the MOS transistor 105 is connected to the terminal 21 of the parallel tuning circuit 301. A reception voltage of the carrier f1 (consecutive data bits "0") is generated from the loop-shaped antenna coil 1 of the circuit 301. Those portions of the positive waveforms of the carrier f1 which cause electromotive force are alternately absorbed by a fixed amount of current determined by the current mirror circuit 19a.

The variation in the current can be sent out as a radio wave transmitted from the radio card 300. Since the resistance of the resistor R6 is equal to about ten times the resistance of the resistor R7 in this embodiment, the mirror current ratio is increased several tens of times and thus the current consumption of the MOS transistor can be reduced sufficiently.

When the nonvolatile memory 306 is in write mode, the output signal of the AND gate 19b becomes "0" and the driver 105 can be rendered nonconductive. In this write mode, therefore, the driver 105 does not function as a load of the parallel tuning circuit 301, thus ensuring efficient data writing. In other words, at the time of writing data to the memory 306, the power consumed by the driver 19 can be suppressed and sufficient power can be secured.

The transfer of data between the radio card 300 and the radio card reader/writer 200 set closer to each other will now be described with reference to the timing chart shown in FIG. 12.

As the radio card 300 is made to approach the radio card reader/writer 200, the radio card 300 receives a two-phase modulated wave signal from the radio card reader/writer 200. If a power supply voltage produced from the two-phase modulated wave signal exceeds a predetermined value, the power supply of the radio card 300 is enabled. After that, the card 300 receives and analyzes a (read or write) command in the two-phase modulated wave signal from the radio card reader/writer 200.

In the write mode, the radio card 300 receives write data following the mentioned command and writes it in a nonvolatile memory 506. In the read mode, the radio card 300 receives an address or the like following the command, reads out data at the address from the memory 506, and transmits it to the radio card reader/writer 200.

As described above, according to this invention, the data or command transmitted from the radio card reader/writer is employed for power supply in the radio card 300 and can be received or transmitted continuously. If the radio card 300 is moved away from the radio card reader/writer 200 thereafter, the power supply voltage produced in response to the two-phase modulated wave signal from the reader/writer 200 becomes lower than a predetermined value, and the power supply of the radio card 300 is disabled.

In this embodiment, the demodulation circuit 213 in the radio card reader/writer 200 performs demodulation using the continuous wave pulse (q) which is produced from the second carrier of the frequency f2 (phase-synchronized with the first carrier of the frequency f1 transmitted from the radio card reader/writer 200) transmitted from the radio card 300. The demodulation is not limited to this method, but the demodulation circuit 213 may perform demodulation directly using the carrier f1 from the controller 205 instead of the continuous wave pulse (q). This modification can eliminate the clock generation circuit while accomplishing reliable demodulation.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A radio card communication apparatus having a transmitting antenna and a receiving antenna for radio communication with a portable radio card having a radio communication function, comprising:

modulation means for modulating a modulated signal, obtained by modulating a command signal including a command and data, with a first carrier of a predetermined frequency to provide a first modulated carrier signal;

transmission means for transmitting said first carrier which is unmodulated from said transmitting antenna to said radio card in order to supply power to said radio card, transmitting said first modulated carrier signal from said transmitting antenna to said radio card and maintaining transmission of said unmodulated first carrier to said radio card in order to supply power thereto after transmission of said first modulated carrier signal;

reception means for receiving a response signal in association with said command signal, modulated with a second carrier, from said radio card via said receiving antenna, comprising a first tuning circuit including a first coil serving as said receiving antenna, a capacitor and a resistor, the capacitor and resistor being connected in parallel to said first coil, for tuning to said second carrier frequency;

a second tuning circuit including a capacitor and a second coil connected in series, and connected in parallel to said first tuning circuit, for tuning to said first carrier thereby to attenuate a first carrier component contained in said response signal;

a differential amplifier having a non-inverting input terminal connected to one end of said first tuning circuit; and a third coil having one end connected to an other end of said first tuning circuit and an other end connected to an inverting input terminal of said differential amplifier, said third coil being closely coupled to said second coil, and generating a signal which corresponds to the first carrier component contained in the response signal received by said reception means, whereby the first carrier component contained in the response signal received is subtracted from said second carrier before being amplified by the differential amplifier; and means for causing said transmission means to stop transmitting said first carrier when reception of said response signal by said reception means is completed.

2. A radio card communication apparatus having a transmitting antenna and a receiving antenna coil for radio communication with a portable radio card having a radio communication function, comprising:

modulation means for modulating a first two-phase modulated signal, obtained by performing two-phase modulation on a read request, with a first carrier of a first predetermined frequency to provide a first modulated carrier signal;

transmission means for transmitting said first carrier which is unmodulated from said transmitting antenna to said radio card in order to supply power to said radio card, transmitting said first modulated carrier from said transmitting antenna to said radio card, and maintaining transmission of said unmodulated first carrier to said radio card in order to supply power thereto after transmission of said first modulated carrier signal;

reception means for receiving a second modulated carrier signal corresponding to said read request signal from said radio card via said receiving antenna coil, comprising a first tuning circuit including a capacitor and resistor connected in parallel to said receiving antenna coil, for tuning to said second carrier frequency;

a second tuning circuit including a capacitor and a second coil connected in series, and connected in parallel to said first tuning circuit, for tuning to said first carrier thereby to attenuate said first carrier component contained in said response signal;

a differential amplifier having a non-inverting input terminal connected to one end of said first tuning circuit; and a third coil having one end connected to an other end of said first tuning circuit and an other end connected to an inverting input terminal of said differential amplifier, said third coil being closely coupled to said second coil, and generating a signal which corresponds to the first carrier component contained in the response signal received by the reception means, whereby said first carrier component contained in said response signal received is subtracted from said second carrier before being amplified by the differential amplifier;

demodulation means for generating said second carrier by frequency-dividing said first carrier and demodulating said received second demodulated carrier signal using said generated second carrier; and means for stopping transmission of said first carrier by said transmission means when reception of said second demodulated carrier signal by said reception means is completed.

* * * * *